United States Patent [19]
Fenton et al.

[11] Patent Number: 5,736,961
[45] Date of Patent: Apr. 7, 1998

[54] DUAL FREQUENCY GLOBAL POSITIONING SYSTEM

[75] Inventors: Patrick C. Fenton; Walter D. Petersen, both of Calgary, Canada

[73] Assignee: NovAtel, Inc., Calgary, Canada

[21] Appl. No.: 540,076

[22] Filed: Oct. 6, 1995

[51] Int. Cl.[6] .................. H04B 7/185; G01S 5/02; G01S 3/16
[52] U.S. Cl. .................. 342/357; 342/352; 342/378
[58] Field of Search .................. 342/352, 357, 342/378

[56] References Cited

U.S. PATENT DOCUMENTS

| | | | |
|---|---|---|---|
| 4,485,383 | 11/1984 | Maher | 343/352 |
| 4,667,203 | 5/1987 | Counselman, III | 342/357 |
| 4,797,677 | 1/1989 | McDoran et al. | 342/352 |
| 4,809,005 | 2/1989 | Counselman, III | 342/352 |
| 4,821,294 | 4/1989 | Thomas | 375/96 |
| 4,841,544 | 6/1989 | Nuytkens | 375/1 |
| 4,860,018 | 8/1989 | Counselman, III | 342/357 |
| 4,862,178 | 8/1989 | Sturza et al. | 342/357 |
| 4,870,422 | 9/1989 | Counselman, III | 342/357 |
| 4,894,662 | 1/1990 | Counselman | 342/357 |
| 4,928,106 | 5/1990 | Ashjaee et al. | 342/352 |
| 4,972,431 | 11/1990 | Keegan | 375/1 |
| 5,073,907 | 12/1991 | Thomas | 375/120 |
| 5,101,416 | 3/1992 | Fenton et al. | 375/1 |
| 5,134,407 | 7/1992 | Lorenz et al. | 342/352 |
| 5,293,170 | 3/1994 | Lorenz et al. | 342/352 |
| 5,390,207 | 2/1995 | Fenton et al. | 375/1 |
| 5,414,729 | 5/1995 | Fenton et al. | 375/209 |
| 5,495,499 | 2/1996 | Fenton et al. | 375/205 |
| 5,535,278 | 7/1996 | Cahn | 380/49 |
| 5,576,715 | 11/1996 | Litton et al. | 342/357 |
| 5,610,984 | 3/1997 | Lennen | 380/49 |
| 5,615,236 | 3/1997 | Turney | 375/365 |
| 5,621,416 | 4/1997 | Lennen | 342/357 |

FOREIGN PATENT DOCUMENTS

| | | |
|---|---|---|
| 0 508 621 A1 | 3/1992 | European Pat. Off. |
| 0 511 741 A1 | 3/1992 | European Pat. Off. |
| WO9530287 | 11/1995 | WIPO. |

OTHER PUBLICATIONS

Allison et al., *A Geodetic Survey Receiver With Up To 12 L1 C/A–Code Channels, and 12 L2 Pseudo–P–Code Channels*, Third Int Tech Meet Satell Div Inst Navig Proceedings of ION GPS, 1990, pp. 31–40.

Allison et al., *C/A–Code Dual Frequency Surveying Receiver Architecture and Performance*, IEEE Plans '88, pp. 434–441.

*Primary Examiner*—Thomas H. Tarcza
*Assistant Examiner*—Hrayr A. Sayadian
*Attorney, Agent, or Firm*—Cesari and McKenna, LLP

[57] ABSTRACT

A global position system receiver recovers the L1 and L2 carriers, the C/A-code measurements and the L1 and L2 P-code measurements by (a) producing an estimate of the L1 carrier phase angle and synchronizing a locally generated C/A-code with the L1 signal using an L1 delay lock loop and controlling, based on the locally generated C/A code, an L1 P-code generator that produces a synchronized version of the P-code; (b) initializing an L2 P-code generator based on the phase of the P-code generated by the L1 P-code generator; (c) determining, for the L2 signal, an estimate of signal power that is adjusted to compensate for noise; (d) determining an L2 carrier phase angle; (e) tracking the L2 P-code by adjusting an L2 P-code generator until the estimate of signal power is maximized. The GPS receiver also resolves a ½ cycle ambiguity in tracking the L2 P-code by comparing demodulated L1 P-code bits and L2 P-code bits. If the bits do not match in the majority of instances, the receiver determines that it is tracking the L2 P-code with ½ cycle error and adjusts its estimate of the P-code phase accordingly. The receiver may determine the reliability of the independently tracked L2 signal, by determining an associated carrier-to-noise ratio.

20 Claims, 2 Drawing Sheets

DUAL FREQUENCY GLOBAL POSITIONING SYSTEM

FIELD OF THE INVENTION

This invention relates generally to global positioning systems (GPS) and, more particularly, to receivers that use GPS ranging signals received over an L1 frequency band and an L2 frequency band to determine their positions.

BACKGROUND OF THE INVENTION

A global positioning system (GPS) includes a number of satellites that each transmit ranging signals over L1 and L2 frequency bands. The ranging signals, referred to herein, respectively, as L1 signals and L2 signals, are modulated by pseudo-random bi-phase codes that are unique to the respective satellites. A GPS receiver receives signals from a number of the satellites and, using the associated codes, determines (i) the differences in times of arrival of the transmitted codes, and (ii) the relative phases of the associated carriers. The receiver then uses this information, in a known manner, to determine its position.

The L1 signals produced by a satellite are modulated by a "C/A" code and a higher rate "P" code. The P-code is encrypted with an encryption code that is known only to government-classified users, such as the military. The signals are further modulated by data that conveys to the receiver certain system-related information, such as the satellite's ephemeris (i.e. position), current time of day (typically a standardized time, such as Greenwich Mean Time), and system status information.

For applications such as navigation that do not require determining "exact" positions, that is, positions to within more than approximately a meter for differential GPS calculations, the GPS receiver determines its position based on the code and carrier phase measurements of the L1 signals from at least four satellites. To do this, the receiver aligns locally-generated versions of the applicable C/A-codes and carriers with the received signals. Then, based on the differences in the clocks in the C/A code generators in the receiver and those in the satellites and on the phase measurements of the carrier signal generators, the receiver calculates its position.

Ionospheric refraction, which alters the path of the signals, introduces errors into the calculations that prevent the receiver from determining its position with greater accuracy. If more precise position information is required, for applications such as surveying, for example, the GPS receiver uses the signals transmitted over both the L1 and the L2 bands.

The ionosphere affects the L1 and L2 signals differently because of the differences in the frequencies of the signals. Since the relative phases of the L1 and L2 signals are known at transmission, the phase difference between the L1 and L2 signals, when down-converted to the same IF frequency at the receiver, is attributable to ionospheric refraction. Accordingly, if this phase difference can be accurately determined at the receiver, the receiver can, using a known formula, determine the changes in the signal paths caused by the ionosphere. It can then correct for these changes, and determine its position to within a small number of centimeters or even millimeters. The accuracy with which the receiver can determine its position is based at least in part on the accuracy of the phase information.

A problem that occurs when determining the phases of the L1 or L2 signals is what is referred to as "carrier-cycle ambiguity." Once the receiver has locked onto a carrier, the receiver can not readily determine which cycle it is receiving at any instant in time, since the cycles are identical. The full-cycle ambiguity affects the accuracy with which the receiver can determine its position using the L1 signals alone or the L1 and the L2 signals. To resolve the ambiguity based on the L1 signals alone, the receiver must determine, by means of the code timing, its position to within one carrier cycle, which is 19 centimeters. This requires lengthy, time-consuming calculations and an estimate of ionospheric refraction that is based on atmospheric conditions. If both the L1 and L2 signals are used, however, the receiver can resolve the carrier-cycle ambiguity once it determines its position to within one cycle of the L1 minus L2, or beat, frequency, which is 86 centimeters. This reduces the amount of calculation, and thus, the time it takes for the receiver to resolve the ambiguity.

One problem with using the L2 signals is that the code contained therein is encrypted. Accordingly, the receiver cannot recover the L2 carriers using the same decoding operations that are used to recover the L1 carriers, namely, the aligning of the locally-generated C/A codes with the (unencrypted) C/A codes in the received signals. Instead, the receiver must remove the unknown encryption code from the L2 P-codes before it can recover the L2 carriers.

In a prior known system, the received L2 signals are squared, to remove the bi-phase encryption code. This produces an output signal that is twice the frequency of the carrier. The receiver then recovers the carrier from this signal. The problem with squaring the signal is that the noise components of the signal are also squared, which adversely affects the recovery of the carrier. Further, it prevents the tracking of the bi-phase P-code, since this code is also removed by the squaring. The result is a less precise determination of the phase difference between the L1 and L2 signals, and thus, a less precise position determination.

Another system has attempted to reduce the affects of the noise by first roughly correlating the L2 signal with a locally-generated version of the P-code, and then squaring the result. While this reduces the adverse affects of the noise somewhat, it does not sufficiently alleviate them.

SUMMARY OF THE INVENTION

The invention is a GPS receiver that recovers the L1 and L2 carriers and the respective C/A and P-code measurements by (i) estimating an L1 carrier phase angle tracking error and adjusting an oscillator that produces an estimate of the L1 carrier phase angle; (ii) synchronizing a locally-generated C/A-code with the L1 signal using an L1 delay lock loop (DLL) and controlling, based on the locally generated C/A code, an L1 P-code generator that produces a synchronized version of the P-code; (iii) initializing an L2 P-code generator based on the phase of the P-code generated by the L1 P-code generator; (iv) determining, for the L2 signal, an estimate of signal power that is adjusted to compensate for noise; (v) determining an L2 carrier phase angle tracking error based on the received signal and the estimated signal power, and adjusting an oscillator that produces an estimate of the L2 carrier phase angle; and (vi) tracking the L2 P-code with an L2 DLL that adjusts the L2 P-code generator until the estimate of signal power is maximized.

More specifically, to decode the L1 signals the receiver splits the signals into baseband inphase (I) and quadrature (Q) components. These components are correlated with, that is, multiplied by, a locally-generated C/A-code. The resulting correlated I and Q signals are then used to estimate the L1 carrier phase angle tracking error as arctan(Q/I). Based on this estimated error, the receiver adjusts a numerically controlled oscillator (NCO) that produces the estimated L1 carrier phase angle that is used to split the incoming L1 signals into the I and Q components. The receiver, using a conventional DLL, tracks the C/A-code in the received signal by adjusting its C/A-code generator to maximize the values of the resulting correlated I and Q signals.

The L1 P-code generator is phase-locked to the L1 C/A-code generator, based on a known phase relationship between the two codes at the transmitter. Since the relative phases of the L1 and L2 P-codes are also fixed at the transmitter, the L1 P-code is used to initialize the L2 P-code generator. The L2 P-code generator then produces a P-code that is, except for the affects of ionospheric refraction, in synchronism with the L2 signal. As discussed below, the receiver aligns the locally-generated P-code with the L2 signal based on an estimate of the L2 carrier phase and a determination of signal power.

To decode the L2 signals the receiver splits these signals into inphase (I) and quadrature (Q) components. Each of these components is simultaneously sent along two paths. In the first path the components are multiplied by the locally-generated version of the P-code. In the second path the components are multiplied by a delayed, or uncorrelated, version of the P-code. This spreads any interference. The first path produces correlated resulting signals, $I_{SIG}$ and $Q_{SIG}$, and the second path produces uncorrelated resulting signals, $I_{NOISE}$ and $Q_{NOISE}$.

The receiver estimates its error in tracking the phase of the L2 carrier based on a phase discriminator output, which includes the product $Q_{SIG}*signI_{SIG}$, where "$signI_{SIG}$" is the sign of the component $I_{SIG}$ and "*" represents multiplication. When the codes are aligned and the carrier is phase-locked to the received signal, the $I_{SIG}$ signal is an estimate of the unknown encryption code. Accordingly, the multiplication removes the estimate of the unknown encryption code from the error calculation.

The product is, however, dependent both on the signal power and on carrier phase angle. Accordingly, the product must be normalized to remove the signal power dependence, so that the phase angle error can be determined. To do this a normalizing factor, $S_T$, is included in the calculation of the phase error estimate. The normalizing factor is based on an estimate of total signal power, $S_{TOTAL}$, and is independent of the carrier phase angle.

The receiver estimates $S_{TOTAL}$ as $S_T = S_I + S_Q$, where $S_I$ and $S_Q$ are the signal power values associated, respectively, with the I and Q components. These values are determined by the equations:

$$S_I = ABS(I_{SIG}) - ABS(I_{NOISE}) \quad [1]$$

$$S_Q = ABS(Q_{SIG}) - ABS(Q_{NOISE}),$$

where "ABS" represents the absolute value. As discussed in more detail below, the noise components eliminate a bias that tends to make $ABS(I_{SIG})$ and $ABS(Q_{SIG})$ less dependent on total signal power, and thus, inappropriate as normalizing factors. As also discussed in more detail below, the receiver produces an estimate of the L2 carrier phase angle tracking error by the formula:

$$ERR_{L2} = K_2 * \arctan\left(\frac{Q*signI}{K_1*S_T}\right) \quad [2]$$

where $K_1$ and $K_2$ are constants that are included, respectively, to ensure that, when no signal is present, all phase angles are equally likely, and to normalize the slope of the arctangent function such that it has a slope of one at zero phase angle. This error estimate, which approximates the true phase error, is used to adjust the oscillator that produces the estimated L2 carrier phase angle. The receiver tracks the L2 P-code by adjusting the L2 P-code generator to maximize $S_T$.

When the system has locked onto the L2 carrier, $S_I$ is substituted for $S_T$ in formula 2, since $S_I$ is a "quieter" estimate of the signal power that includes only one-half of the noise that is not eliminated by subtracting the noise components $I_{NOISE}$ and $Q_{NOISE}$ from $I_{SIG}$ and $Q_{SIG}$.

Once the carrier phase angle tracking errors are minimized, the receiver resolves the ½-cycle ambiguities that are associated with using the arctangents to determine the phase errors. For the L1 signals, the receiver determines if particular bits in the received data have predetermined values. If the bits are inverted, the receiver determines it is tracking with a ½-cycle error. It then adjusts by ½ cycle the oscillator that produces the estimated L1 carrier. To resolve the ambiguity for the L2 signals, the receiver compares the demodulated bits of the encrypted L2 P-code with the corresponding demodulated bits of the encrypted L1 P-code. Since the two codes are encrypted with the same encryption code, the ambiguity can be resolved by this comparison. Accordingly, if the majority of bits of the L2 code are inverted from those of the L1 code, the receiver determines that it is tracking the L2 carrier with a ½ cycle error. It then appropriately adjusts the oscillator that produces the estimated L2 carrier.

The receiver determines the relative phases of the L1 and L2 carriers from the associated oscillators, and the C/A- and P-code time of arrival measurements from the associated local code generators. It then uses the phase information and the code measurements, in a conventional manner, to (i) resolve the full carrier cycle ambiguities, (ii) correct for ionospheric refraction and (iii) determine its position.

BRIEF DESCRIPTION OF THE DRAWINGS

The above and further advantages of the invention may be better understood by referring to the following description in conjunction with the accompanying drawings, in which.

DETAILED DESCRIPTION OF AN ILLUSTRATIVE EMBODIMENT

Figure 1:
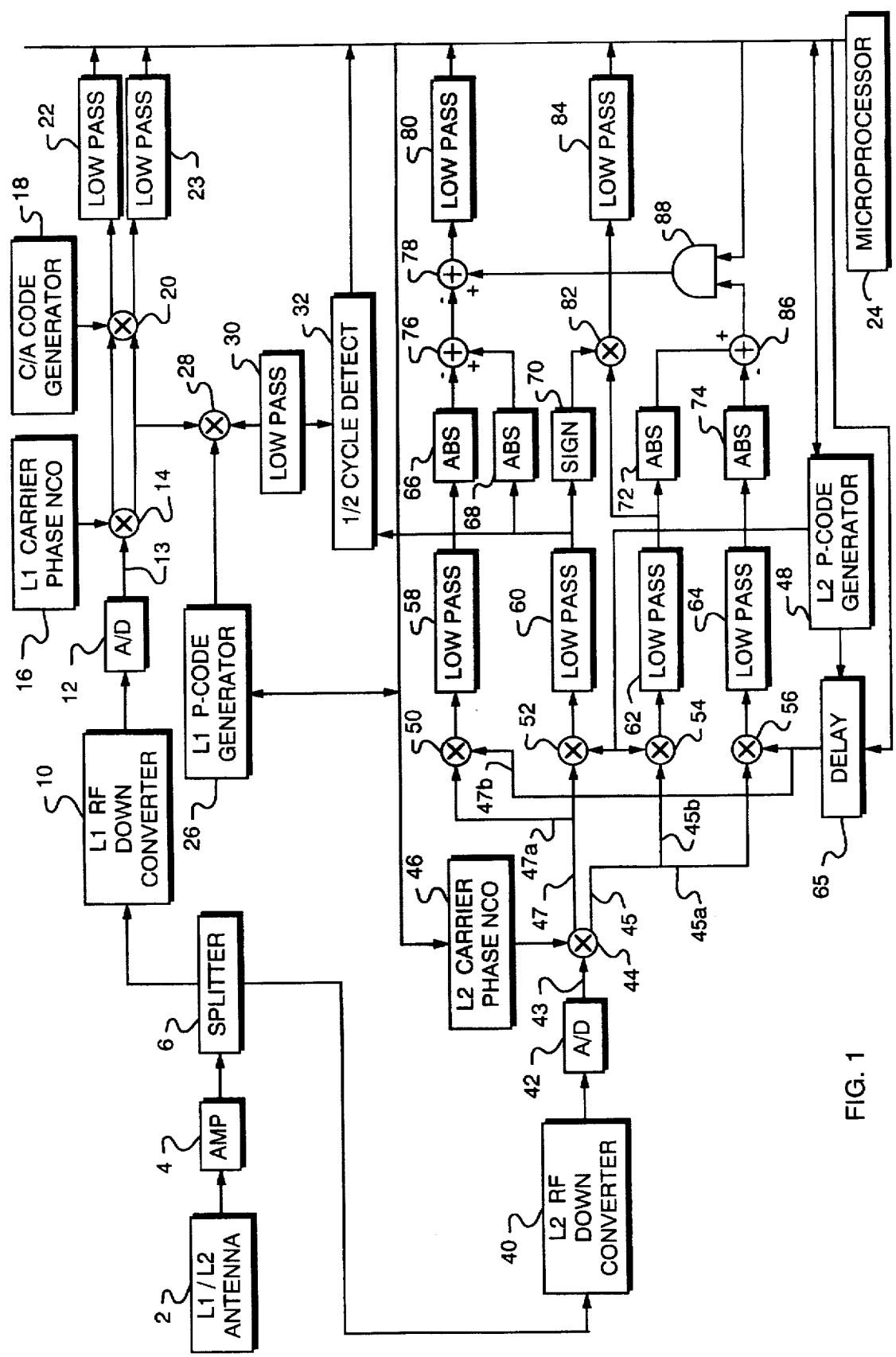
FIG. 1 is a functional block diagram of a GPS receiver constructed in accordance with the invention.

FIG. 1 depicts a GPS receiver 1 that receives signals from GPS satellites (not shown) over an antenna 2. The received signals are amplified by an amplifier 4 and split by a splitter 6 into L1 signals and L2 signals. The splitter sends the L1 signals to an L1 down converter 10 and the L2 signals to an L2 down converter 40.

The L1 down converter 10 converts the received L1 signals from the L1 frequency to a frequency that is compatible with an analog-to-digital converter 12. The analog-to-digital converter 12 samples the down converted signal at a rate that satisfies the Nyquist theorem, and produces an associated digital signal, which it sends along a digital bus 13 to a phase rotator 14. The phase rotator 14 receives from a numerically controlled oscillator (NCO) 16 an estimate of the L1 carrier phase angle, $\phi_{L1}$. Based on the estimate, the phase rotator produces baseband inphase (I) and quadrature (Q) signal components.

Figure 2:
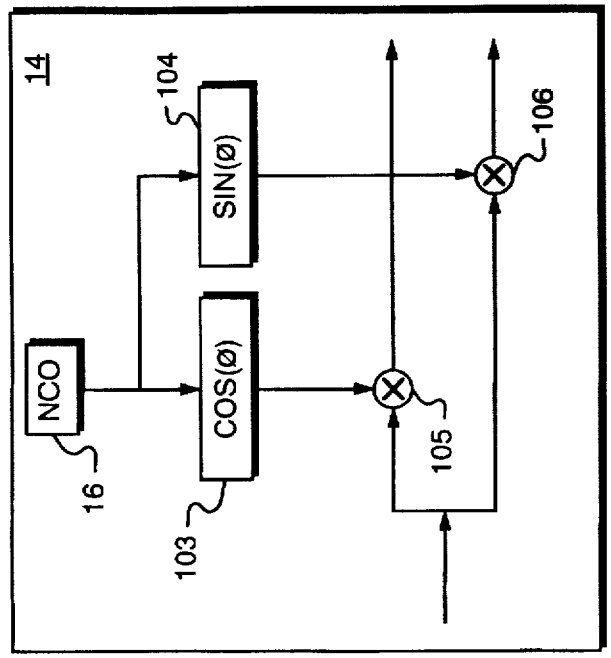
FIG. 2 is a functional block diagram of a phase rotator included in the receiver of FIG. 1.

More specifically, as depicted in FIG. 2, the phase rotator 14 produces from the phase angle estimate $\phi_{L1}$ two values, namely, $\cos(\phi_{L1})$ and $\sin(\phi_{L1})$ in calculators 103 and 104. Multipliers 105 and 106 multiply these values by the digital signal samples, effectively rotating the samples by the phase angle and also 90° relative to one another, to produce the I and Q samples.

Referring again to FIG. 1, the I and Q signal components are applied to a correlator 20, which separately multiplies the signals by a locally-generated C/A-code produced by a C/A-code generator 18. The resulting $I_{CORR}$ and $Q_{CORR}$ signals are separately low pass filtered by filters 22 and 23, to produce $I_{LPF}$ and $Q_{LPF}$ signals. The resulting signals are used by a microprocessor 24 in a conventional DLL, part of which operates in software, to produce an adjustment signal for the C/A code generator 18. The signals are also used by the microprocessor 24, to determine an estimate of a carrier phase angle tracking error, $ERR_{L1}$, by computing:

$$ERR_{L1} = \arctan(Q_{LPF}/I_{LPF}).$$

This error estimate is then used to adjust the NCO 16, to reduce the phase angle tracking error. As is well known to those skilled in the art, the phase angle error estimate may also be used in a conventional manner in the L1 DLL, to provide carrier-aided tracking.

To produce the L1 signal at the satellite, the carrier is modulated by a C/A-code and a P-code that are 90° out of phase. Accordingly, the baseband I components include components of the C/A-code and essentially no P-code components. Conversely, the baseband Q components include components of the P-code and essentially no C/A-code components. Thus, after the C/A-code is removed by the correlator 20, the resulting $I_{CORR}$ signals are modulated only by the transmitted, system-related data, and the microprocessor 24 extracts the data based on the sign of the $I_{LPF}$ signals.

The calculation of phase tracking angle error, $ERR_{L1}$, using the arctangent results in a ½-cycle ambiguity in tracking the C/A code. This means that the NCO 16 may be tracking the carrier with a ½-cycle error. The microprocessor 24 resolves the ambiguity by examining bits of the transmitted data to determine if particular bits have their expected values. If these bits are inverted, the system is tracking with a ½-cycle error. This error is corrected by appropriately adjusting the NCO 16.

The microprocessor 24 continues to track the C/A-code by adjusting the C/A-code generator 18 to maximize the values of the $I_{LPF}$ and $Q_{LPF}$ signals.

Once the receiver 1 is tracking the C/A code, the microprocessor 24 initializes an L1 P-code generator 26 based on timing information included in the dam. Using the known phase relationship between the C/A- and P-codes in the L1 band, the microprocessor 24 phase locks the L1 P-code generator 26 to the L1 C/A-code generator 18, and no further adjustments of the L1 P-code generator 26 are necessary.

The microprocessor 24 then initializes the L2 P-code generator 48 based on the phase of the locally-generated L1 P-code. Since the relative phases of the two codes are fixed at transmission, the L2 P-code generator 48 produces a P-code that is, except for the affects of ionospheric refraction, in synchronism with the L2 signal. To align the locally generated P-code with the L2 signal, the microprocessor determines the L2 carrier phase angle and total signal power and, as discussed below, adjusts the L2 P-code generator to maximize signal power.

Referring still to FIG. 1, the L2 down converter 40 converts the received L2 signal from the L2 frequency to a frequency that is compatible with an analog-to-digital converter 42. The analog-to-digital converter 42 samples the down converted signal at a rate that satisfies the Nyquist theorem, and produces an associated digital signal that it sends along a digital bus 43 to a phase rotator 44. The phase rotator 44 also receives an estimate of the L2 carrier phase angle from an NCO 46, and produces baseband I and Q signal components. The rotator 44 operates in the same manner as phase rotator 14, which is discussed above with reference to FIG. 2.

The I and Q signal components are each, respectively, sent along two paths 47a–b and 45a–b, to correlators 50 and 52 (the I components) and correlators 54 and 56 (the Q components). The I and Q signal components that are sent, respectively, to correlators 52 and 54 are multiplied by the correlated version of the locally-generated P-code produced by the L2 P-code generator 48. This removes the P-code components of the received signals, and produces $I_{SIG}$ and $Q_{SIG}$ signals that are modulated only by the unknown encryption code. The $I_{SIG}$ and $Q_{SIG}$ signals are low pass filtered by variable low pass filters 60 and 62, to a bandwidth that is appropriate for the estimated encryption code bit rate. This produces $I_{SIG(LPF)}$ and $Q_{SIG(LPF)}$, that, as discussed below, are used to estimate the phase angle tracking error, $ERR_{L2}$.

The I and Q signal components that are sent to correlators 50 and 56 are multiplied by an uncorrelated version of the P-code. This spreads any interfering signals that may be present in the received signal. To produce the uncorrelated version of the P-code, a delay 65 delays by more than 2 code chips the code produced by the P-code generator 48. The length of the delay is selected such that, under normal operating conditions for the receiver, there is no correlation expected between the received signal and the delayed version of the signal. The resulting uncorrelated signals, $I_{NOISE}$ and $Q_{NOISE}$, are filtered by variable low pass filters 58 and 64 to a bandwidth that is appropriate for the estimated encryption code bit rate. The results, $I_{NOISE(LPF)}$ and $Q_{NOISE(LPF)}$, are then used in conjunction with the $I_{SIG}$ and $Q_{SIG}$ signals, to determine the phase discriminator output, which approximates the L2 carrier phase angle tracking error, $ERR_{L2}$.

Specifically, a multiplier 82 multiplies $Q_{SIG(LPF)}$ by the sign of $I_{SIG}$, to remove an estimate of the encryption code. The result is low pass filtered by low pass filter 84, to produce $(Q_{SIG(LPF)} * \text{sign } I_{SIG})_{LPF}$. This product is proportional to both signal power and the estimated phase angle. Accordingly, before this product can be used to estimate, the carrier phase angle tracking error, it must be made independent of signal power. The quantity is thus divided by a normalizing signal that is proportional to signal power.

The normalizing signal, $S_T$ is an estimate of the total signal power, $S_{TOTAL}$. The estimated $S_T$ is the sum of the signal power in the inphase path, $S_I$, and the signal power in the quadrature path, $S_Q$, determined over intervals set by the estimated encryption code bit rate. These quantities are calculated as:

$$S_I = ABS(I_{SIG(LPF)}) - ABS(I_{NOISE(LPF)})$$

$$S_Q = ABS(Q_{SIG(LPF)}) - ABS(Q_{NOISE(LPF)})$$

where ABS() is the absolute value. As discussed below, $S_I$ may be substituted for $S_T$ when the tracking error, $ERR_{L2}$, is small.

Summers 76 and 86, respectively, subtract the absolute value of the noise components from the absolute value of the appropriate correlated signals. This removes biases that would otherwise dominate the signal mean throughout the GPS signal range when baseband downconversion is used. These biases tend to reduce the dependency of the absolute values of the correlated signals on signal power, and thus, makes them inappropriate for use as normalizing signals. The biases cannot be removed by filtering, however, because the low pass filtering is limited by the expected 500 kHz encryption code chip rate.

The absolute values of the signals are calculated by rectifying the signals in rectifiers 66, 68, 72 and 74. The rectification, which is a "distorted squaring," produces $S_I$ and $S_Q$ signals that are proportional both to signal power and, respectively, to $\cos^2(\phi_{L2})$ and $\sin^2(\phi_{L2})$, where $\phi$ is the estimated phase angle. The estimated total signal power, $S_T$, produced in summer 78 is independent of the carrier tracking phase angle since $\cos^2(\phi_{L2})+\sin^2(\phi_{L2})=1$.

The system low pass filters $S_T$ to produce $S_{T(LPF)}$, which is used to normalize the product Q * signI. The normalized product is then used to determine an estimate for the L2 carrier tracking phase angle error, $ERR_{L2}$:

$$ERR_{L2} = K_2 * \arctan\left(\frac{Q*signI}{K_1*S_T}\right)$$

where $K_1$ and $K_2$ are constants.

The constant $K_1$ is required to map the probability density function (PDF) of the arctangent of the quotient to a uniform PDF when no signal is present. This ensures that all phase angles are equally likely before signal acquisition. Without $K_1$, the variances of $(Q_{SIG(LPF)}*sign\ I_{LPF})_{LPF}$ and $S_{T(LPF)}$ are not equal, and the PDF of the arctangent function peaks at zero degrees. This indicates that certain phase angles are more likely than others, and thus, that the error calculation would tend to drive the estimated carrier to these particular angles.

$K_1$ can be determined at start-up, that is, before the signal is acquired, by dividing an analytically determined standard deviation equation for the numerator $(Q_{SIG(LPF)}*sign\ I_{LPF})_{LPF}$ by an analytically determined standard deviation equation for the denominator $S_{T(LPF)}$. Alternatively, $K_1$ can be determined by mathematical analysis of the receiver or by Monte Carlo analysis.

The constant $K_2$ is required to make the slope of the phase discriminator output one at zero phase. This constant is the inverse of the derivative of the equation for the analytical mean of the arctangent function, evaluated at zero carrier phase angle tracking offset and with the tracking loop update rate and signal level such that the standard deviation of the carrier phase angle tracking error is small (i.e., less than 10°). Alternatively, $K_2$ may be determined by mathematical analysis of the receiver or by Monte Carlo analysis.

Once lock is acquired, and thus, the phase angle is known, the inphase signal power, $S_I$, is used as the normalizing signal instead of $S_T$, since $S_I$ has a lower variance than $S_T$ within a reasonable carrier phase tracking error range. A summer 88, which is under the control of the microprocessor 24, allows $S_Q$ to be added into the calculations for the normalizing signal before lock is acquired and inhibits its inclusion after lock is acquired.

Using $S_I$ as the normalizing signal effectively lowers the threshold for loss of lock, because of the lower variance. Further, the resulting mean of the phase angle estimate is proportional to tan $(\phi_{L2})$, which results on a more linear angle estimation than that produced when $S_T$ is used as the normalizing signal.

The receiver uses a DLL, in a conventional manner, to track the L2 P-code by adjusting the phase of the L2 P-code generator 48 to maximize $S_{T(LPF)}$. This tracking method eliminates the data transmitted over the L2 band. As discussed above, using the arctangent to calculate the phase error estimate results in a ½-cycle ambiguity. To resolve this ambiguity without the data bits, a detector 31 compares demodulated code bits from the encrypted L1 and L2 P-codes. If the L2 P-code bits are inverted, the NCO 46 is adjusted.

Figure 3:
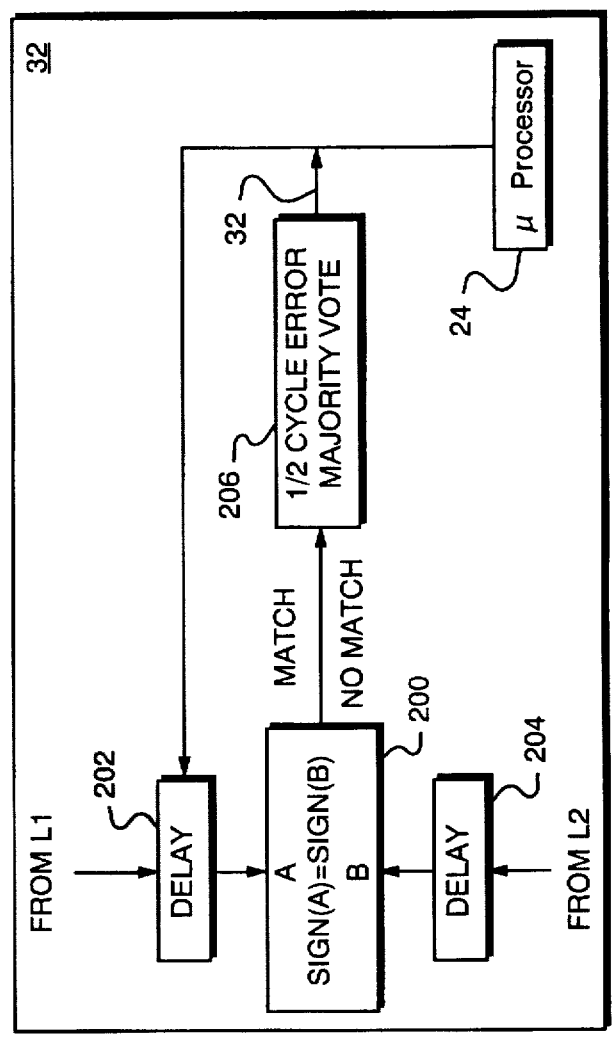
FIG. 3 is a functional block diagram of a system for resolving a ½-cycle ambiguity in the tracking of the L2 P-code by the receiver of FIG. 1.

Referring now to FIG. 3, the detector 32 compares, in circuit 200, the demodulated bits of the encrypted L1 P-code with the same bits of the encrypted L2 P-code. Delays 202 and 204, respectively, delay the bits from the L1 code and the L2 code, to compensate for differences in signal propagation, and thus, align the bits. The delays 202 and 204, which are under the control of the microprocessor 24, are together equal to the phase difference between the L1 and L2 codes produced by the L1 and L2 P-code generators.

The compare circuit 200 compares the signs of the aligned bits and provides for each set of bits a match or no match signal. Based on these signals, a majority vote circuit 206 produces a vote signal that represents by its state whether the majority of bits match or do not match. The microprocessor 24 periodically samples the vote signal and, if the vote signal signifies that the majority of bits do not match, the microprocessor adjusts the NCO 46.

The comparison of the L1 and L2 P-code bits can be made at the P-code rate or at the estimated encryption code rate. However, the signal strength is greater when the comparisons are made at the narrower bandwidth of the encryption code rate.

Referring also to FIG. 1, the delay 65 should be selected such that it delays the code by a number of chips that is beyond the chip range through which the receiver searches for the L2 P-code. Otherwise, if the locally generated code and the received signal are out of synchronism by a number of chips that is equal or close to that used in delay 65, the receiver may detect correlation power in the $I_{NOISE}$ and $Q_{NOISE}$ signals when the received signal is multiplied by the delayed code. When this occurs, the $I_{SIG}$ and $Q_{SIG}$ signals, which are produced by multiplying the I and Q signals by a version of the code that is not delayed, and thus, not correlated with the received signal, are noise. This means that the signals representing the demodulated P-code "bits" are also noise. When these "bits" are compared, in the detector 32, to the demodulated L1 P-code bits, the result is approximately equal numbers of matches and no matches. This, in turn, results in essentially periodic adjustment of the phase of the NCO 46 by one-half cycle.

If the detector 32 detects equal numbers of matches and no matches, the microprocessor 24 may shift the L2 P-code generator by the number of chips that corresponds to the delay 65. This results in correlation power being detected in the $I_{SIG}$ and $Q_{SIG}$ signals, instead of in the $I_{NOISE}$ and $Q_{NOISE}$ signals. Similarly, if the detector determines that the numbers of matches and no matches vary by relatively small amounts, the microprocessor 24 may shift the code generator 48 by an amount that is slightly less than the number of chips that correspond to the delay 65.

The ½ cycle detector 32 may also be used to resolve ½ cycle ambiguities that arise in receivers that track the L2 P-code but use alternative methods to determine the L2 carrier phase. For example, the ½ cycle detector may be used in systems that track the L2 P-code and remove it from the signal, and then square the resulting signal to recover the L2 carrier.

Once the receiver is tracking the C/A code and the L1 and L2 P-codes and carriers, it determines the L1 code and phase measurement signals, respectively, from the L1 code and carrier generators 16, 18 and 26 and the L2 code and phase measurements from the L2 code and carrier generators 48 and 46. Using these measurements, the receiver resolves the full cycle ambiguities, corrects for ionospheric refraction and determines its position. Further, since the L2 code and phase measurements are determined independently from the L1 measurements, with the exception of the resolution of the ½ cycle ambiguity, the receiver can determine carrier-to-noise ratios for each band. It can thus determine the reliability of each of the L1 and L2 signals.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A global position sensing receiver for receiving over L1 and L2 bands, respectively, L1 signals that are modulated both by a C/A-code and a P-code that is, at times, encrypted and L2 signals that are modulated by the P-code that is, at times, encrypted, the receiver including:
   A. means for producing a locally-generated version of the C/A-code that is aligned with the C/A-code in the received L1 signal;
   B. an L1 P-code generator for producing a locally-generated version of the P-code that is phase-locked to the locally-generated version of the C/A-code;
   C. an L2 carrier angle estimation means for producing an estimate of the phase angle of an L2 carrier;
   D. an L2 P-code generator for producing a locally-generated version of the P-code;
   E. a controller for controlling the operations of the L2 P-code generator, the controller receiving signals associated with a correlation between the locally-generated P-code and the received L2 signals, and adjusting the L2 P-code generator to align the locally-generated P-code with the L2 signals; and
   F. a detector for resolving a ½-cycle ambiguity in tracking the L2 P-code, the detector including:
      i. a majority vote circuit for determining if a majority of bits of the received L2 P-code match or do not match corresponding bits of the received L1 P-code, and
      ii. means for adjusting the carrier angle estimation means if the majority vote circuit determines that a majority of the L1 and L2 bits do not match.

2. The global position sensing receiver of claim 1, wherein the controller receives signals associated with the estimated phase angle of the L2 carrier.

3. The global position sensing receiver of claim 1 wherein the controller determines a carrier phase error estimate as:

$$ERR_{L2} = K_2 * \arctan\left(\frac{Q * signI}{K_1 * S_T}\right)$$

where $K_1$ and $K_2$ are constants, I and Q are in phase and quadrature correlation signals, "sign I" represents the sign of the I signal, and $S_T$ is an estimate of total signal power, and based on the error estimate adjusts the L2 carrier angle estimation means.

4. The global position sensing receiver of claim 3 wherein the controller determines total signal power as a sum of
   a. signal power in an inphase path minus inphase noise components, and
   b. signal power in a quadrature path minus quadrature noise components.

5. The global position sensing receiver of claim 4 wherein the noise components are determined by a multiplying inphase and quadrature components of the L2 signal by an uncorrelated version of the P-code produced by the L2 P-code generator.

6. The global position sensing receiver of claim 4 wherein the controller, after lock is acquired, substitutes for the estimate of the total signal power the signal power in the inphase path minus noise.

7. The global position sensing receiver of claim 1 wherein the controller, to determine carrier phase tracking error, tracks arctan(Q*signI), where I and Q are inphase and quadrature correlation signals, and based on a determination of the phase error adjusts the L2 carrier angle estimation means.

8. The global position sensing receiver of claim 1 further including means for determining the reliability of the L2 signal by determining an associated carrier-to-noise ratio.

9. A global position sensing receiver for receiving over L1 and L2 bands, respectively, L1 signals that are modulated both by a C/A-code and a P-code that is, at times, encrypted, and L2 signals that are modulated by the P-code that is, at times, encrypted, the receiver including:
   A. means for producing a locally-generated version of the C/A-code that is aligned with the C/A-code in the received L1 signal;
   B. an L1 P-code generator for producing a locally-generated version of the P-code that is phase-locked to the locally-generated version of the C/A-code;
   C. an L2 P-code generator for producing a locally-generated version of the P-code;
   D. correlation means for determining how closely the P-code produced by the L2 P-code generator and the P-code in the L2 signal are aligned, said means producing L2 correlation signals;
   E. L2 carrier angle estimation means for providing an estimate of a carrier phase angle based on the correlation signals produced by the correlation means; and
   F. a controller for controlling the operations of the L2 P-code generator and the L2 carrier angle estimation means, the controller receiving signals from the correlation means and the L2 Carrier angle estimate means, and adjusting the L2 P-code generator, to align the locally-generated P-code with the L2 signals, and adjusting the L2 carrier angle estimation means to phase lock said means to the L2 signal, the controller determining a carrier phase error estimate as:

$$ERR_{L2} = K_2 * \arctan\left(\frac{Q * signI}{K_1 * S_T}\right)$$

where $K_1$ and $K_2$ are constants, I and Q are inphase and quadrature correlation signals, "sign I" represents the sign of the I signal, and $S_T$ is an estimate of total signal power, the controller using the error estimate to adjust the L2 carrier angle estimation means.

10. The global position sensing receiver of claim 9 wherein the controller further includes means for determining the reliability of the L2 signals.

11. The global position sensing receiver of claim 9 wherein the controller determines total signal power as a sum of
   a. signal power in an inphase path minus inphase noise components, and b. signal power in a quadrature path minus quadrature noise components.

12. The global position sensing receiver of claim 11 wherein the noise components are determined by multiplying inphase and quadrature components of the L2 signal by an uncorrelated version of the P-code produced by the L2 P-code generator.

13. The global position sensing receiver of claim 11 wherein the controller, after lock is acquired, substitutes for the estimate of the total signal power the signal power in the inphase path minus inphase noise components.

14. The global position sensing receiver of claim 9 wherein the controller, to determine carrier phase tracking error, tracks the product arctan(Q*signI), where I and Q are inphase and quadrature correlation signals.

15. The global position sensing receiver of claim 14 further including a detector for resolving a ½-cycle ambiguity in tracking the L2 P-code, the detector including:

i. a majority vote circuit for determining if a majority of bits of the received L2 P-code match or do not match corresponding bits of the received L1 P-code, and ii. means for adjusting the carrier angle estimation means if the majority vote circuit determines that a majority of the L1 and L2 bits do not match.

16. A global position sensing receiver for receiving over L1 and L2 bands, respectively, L1 signals that are modulated both by a C/A-code and a P-code that is, at times, encrypted, and L2 signals that are modulated by the P-code that is, at times, encrypted, the receiver including:

A. means for producing a locally-generated version of the C/A-code that is aligned with the C/A-code in the received L1 signal;

B. an L1 P-code generator for producing a locally-generated version of the P-code that is phase-locked to the locally-generated version of the C/A-code;

C. an L2 P-code generator for producing a locally-generated version of the P-code;

D. correlation means for determining how closely the P-code produced by the L2 P-code generator and the P-code in the L2 signal are aligned, said means producing L2 correlation signals;

E. L2 carrier angle estimation means for providing an estimate of a carrier phase angle based on the correlation signals produced by the correlation means; and F. a controller for controlling the operations of the L2 P-code generator and the L2 carrier angle estimation means, the controller receiving signals from the correlation means and the L2 carrier angle estimate means, and adjusting the L2 P-code generator, to align the locally-generated P-code with the L2 signals, and adjusting the L2 carrier angle estimation means to phase lock said means to the L2 signal, the controller determining a carrier phase error estimate based on an estimate of total signal power, $S_T$, which is determined as a sum of a. signal power in an inphase path minus inphase noise components, and b. signal power in a quadrature path minus quadrature noise components, the controller using the error estimate to adjust the L2 carrier angle estimation means.

17. The global position sensing receiver of claim 16 wherein the noise components are determined by multiplying inphase and quadrature components of the L2 signal by an uncorrelated version of the P-code produced by the L2 P-code generator.

18. The global position sensing receiver of claim 17 wherein the controller determines a carrier phase error estimate as:

$$ERR_{L2} = K_2 * \arctan\left(\frac{Q*signI}{K_1*S_T}\right)$$

where $K_1$ and $K_2$ are constants, I and Q are inphase and quadrature correlation signals, "sign I" represents the sign of the I signal.

19. The global position sensing receiver of claim 16 wherein the controller, after lock is acquired, substitutes for the estimate of the total signal power the signal power in the inphase path minus inphase noise components.

20. The global position sensing receiver of claim 16 further including a detector for resolving a ½-cycle ambiguity in tracking the L2 P-code, the detector including:

i. a majority vote circuit for determining if a majority of the bits in the L2 P-code match or do not match corresponding bits of the L1 P-code, and ii. means for adjusting the carrier angle estimation means if the majority vote circuit determines that a majority of the L1 and L2 bits do not match.

* * * * *